Dec. 9, 1952 — O. J. POUPITCH — 2,620,538
QUICK FASTENING DEVICE
Original Filed Feb. 7, 1945 — 2 SHEETS—SHEET 2
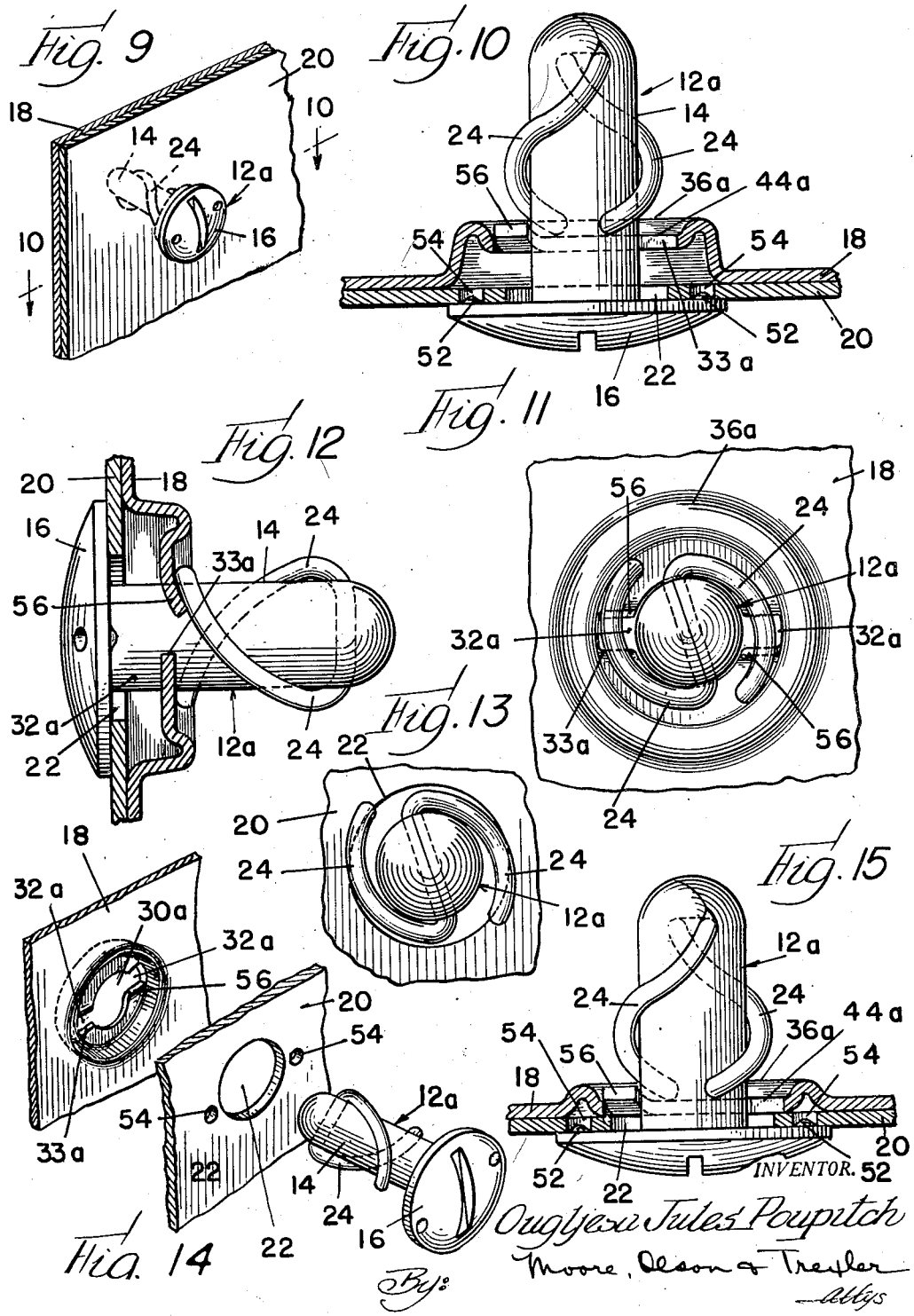

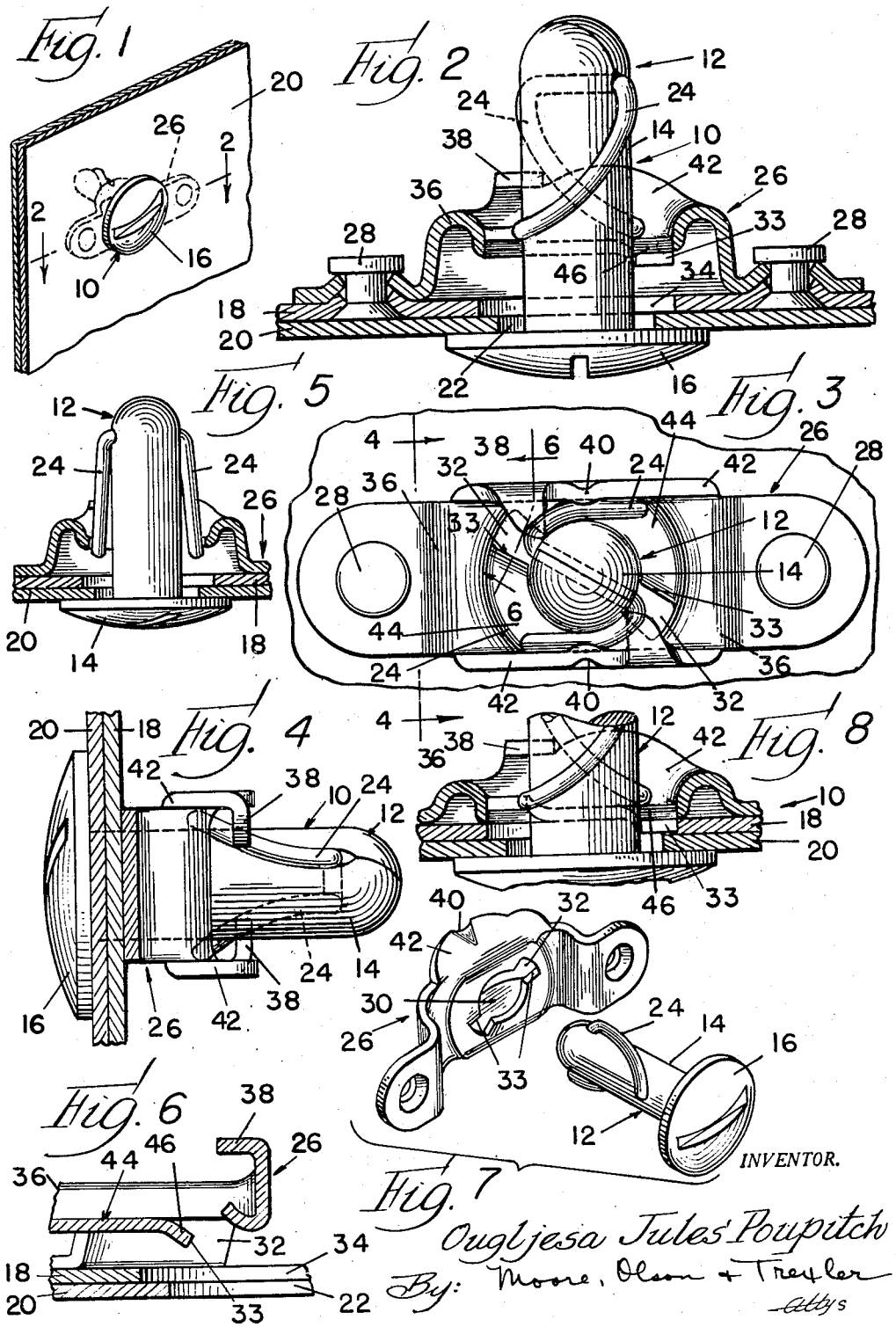

Patented Dec. 9, 1952

2,620,538

UNITED STATES PATENT OFFICE 2,620,538

QUICK FASTENING DEVICE

Ougljesa Jules Poupitch, Chicago, Ill., assignor to Illinois Tool Works, Chicago, Ill., a corporation of Illinois Original application February 7, 1945, Serial No. 576,592. Divided and this application November 10, 1948, Serial No. 59,277

16 Claims. (Cl. 24—221)

The present invention relates to new and useful improvements in fasteners adapted for use with an apertured work structure having opposed surfaces to be clampingly engaged, and more particularly to such improvements in fasteners which include a novel rotary stud with means for clamping the opposed surfaces of the work structure.

Fastener devices adapted to quickly attach and detach sheet metal parts, such as cowling parts of an airplane, have heretofore been used extensively in certain fields. Generally speaking, most of these cowl fasteners have employed, as one element thereof, a relatively expensive sheet metal stamping. It has also been common practice to use, in association with such sheet metal stampings, a stud member equipped with a rigid lateral lug for engaging a cam-like surface on the sheet metal fastener part. The present invention proposes the use of a fastener of simple yet durable construction which precludes the necessity of employing expensive sheet metal stampings as well as high cost stud members. To this end, the present invention contemplates a quickly operable fastener device which incorporates a stud member of novel and efficiently operable design having a plurality of resilient arms carried by the stud member.

An object of the present invention is to provide a fastener device for the above type in which the resilient arms are substantially symmetrically arranged with respect to the stud shank so as to be stressed into firm clamping engagement with the work structure upon insertion of the stud.

Another object of the present invention is to provide a fastener device in which a rotary stud member is equipped with resilient arms adapted to extend along the peripheral surface of the stud toward the stud head with free extermities of the arms adapted to yieldably clamp work pieces together.

More specifically the invention contemplates a quickly operable fastener device of the type referred to above wherein the resilient arms of the stud member may be stressed or flexed into helical form as the stud is rotated within registering apertures of the work pieces.

Another object of the present invention is to provide a fastening device having the general form referred to above in which means is provided adapted to engage the resilient arms and thereby secure the stud against inadvertent and unintentioned loosening.

Still more specifically, the invention contemplates a fastener in which a novel fastener stud is employed having arms constructed of a length of wire of firm resilient material secured at its intermediate portion within the stud body and having opposite extremities of the wire bent into superimposed relation with respect to the stud periphery to provide free extremities positioned externally of the stud for resiliently and lockingly engaging a clamping surface.

The objects referred to above as well as other conveniences and advantages will be apparent from the following description when considered in connection with the accompanying drawings, wherein:

Figure 1 is a perspective view of a fastener constructed in accordance with the teachings of the present invention and shown in operative association with two work sheets or cowling parts;

Figure 2 is an enlarged horizontal sectional view taken substantially along the line 2—2 of Figure 1;

Figure 3 is a rear view of the device as illustrated in Figure 2;

Figure 4 is a vertical sectional view taken at right angles to the device as shown in Figure 3, said view being taken substantially along the line 4—4 of Figure 3;

Figure 5 illustrates the manner in which the fastener stud may be initially associated with the cowling parts before applying rotation to the stud;

Figure 6 is an enlarged fragmentary detailed sectional view taken substantially along the line 6—6 of Figure 3 to more clearly illustrate the cam and abutment structure;

Figure 7 is a perspective exploded view of the fastener device illustrating the stud detached from the sheet metal stamping;

Figure 8 is a partial view similar to Figure 2 and illustrating the manner in which the entire stamping part of the fastener device is positioned adjacent the inner work piece or sheet;

Figure 9 is a perspective view similar to Figure 1 disclosing a modified fastener device applied to a pair of work sheets;

Figure 10 is a view taken substantially along the line 10—10 of Figure 9, the stud member being shown in elevation and the associated work sheets being shown in section;

Figure 11 is a plan view of the device as illustrated in Figure 10;

Figure 12 is a sectional view taken at right angles of the device as shown in Figure 10;

Figure 13 is a plan view of the device as shown in Figure 10 when it is disassociated from one of the work pieces, said view disclosing the manner in which the resilient stud arms project radially outward a sufficient distance to prevent inadvertent disassociation of the stud member from its associated work piece;

Figure 14 is an exploded view of the three parts illustrated in Figure 9, the resilient arms of the fastener being helically preformed; and Figure 15 discloses a modified fastener arrangement wherein the locking portion of the inner work piece or sheet is substantially coincident with the plane of said sheet.

Referring now to the drawings more in detail, wherein like numerals are employed to designate similar parts throughout the various figures, it will be seen that the fastener device of the present invention is designated generally by the numeral 10, Figures 1 to 7 inclusive. This fastener device includes a rotary stud structure designated by the numeral 12, said stud comprising a shank portion 14 and a head 16 provided at one extremity thereof. The stud is disclosed in association with a pair of work pieces or cowling parts, namely, an inner part 18 and an outer part 20. The stud 12 is designed to be held within an aperture 22 of the outer work piece or sheet 20.

Particular attention is directed to a pair of resilient work engaging or latching arms 24 supported at the entering extremity of the stud shank 14. In the disclosed embodiment the stud shank is bifurcated at the entering extremity so as to accommodate and impinge the intermediate portion of a length of wire of firm resilient material. The portions of the wire extending from opposite sides of the shank provide the above mentioned firm resilient arms 24.

In the embodiment disclosed in Figures 1 to 7 inclusive, the stud structure is disclosed in operative association with a companion stamping designated generally by the numeral 26 which is permanently secured to the inner work sheet by means of rivets 28. The central portion of the stamping is apertured so as to provide an opening 30, Figure 7, for receiving the stud shank 14 and radial openings 32 communicating with the central opening 30 for accommodating the resilient latching arms 24. This opening 30 in the stamping 26 registers with a larger opening 34 in the work sheet 18, Figure 2. As the stud is telescopically associated with the registering apertures 30 and 34, the arms 24 of said stud pass through the radial openings 32, opposed radial bounding edges 33 of which present abutment edges for cooperation with the free ends of the arms 24. Arcuate ribs 36, struck up from the plane of the stamping 26 serve to limit the lateral or radial deflection of the free extremities of the arms 24 beyond a limited extent.

Prior to the association of the stud with the work piece 18 and stamping 26, the arms 24 may occupy either the straight undeflected relation as illustrated in Figure 5 or may be preformed into a helix as illustrated in Figure 7. With the stud arms 24 occupying the position as illustrated in Figure 5, wherein they are shown straight or undeflected, subsequent rotation of the stud causes the lower extremities of the arms to engage radial abutment edges 33 of the radial openings 32 so that the arms are caused to ride up thereon into flexed position and to ultimately assume the helical position shown in Figures 2 and 3. In this position each arm becomes lodged between an abutment 38 on one side and a dimple or protuberance 40 on the other side. The dimple 40 may be made by indenting a side section or wall 42 bent upwardly from the margin of the stamping 26, with the curvature or angular disposition of the arms defined by the resiliency thereof in opposition or reaction to the forces applied at the ends thereof. The arms 24 are adapted to snap past the protuberance 40 as they reach the limit of their rotation thereby preventing inadvertent or unintentional loosening of the stud. The abutments 38 constitute extensions from the upper margin of a companion side wall 42.

It will also be noted that as the free extremities of the arms rotatably pass from the radial openings or recesses 32 over the abutment edges 33 and into engagement with arcuate surfaces 44, Figure 6, they initially pass over a downwardly bent section 46, which serves to facilitate the initial deflection or bending of the arms. To reduce the force required to impart retrograde rotation to the stud, the free extremities of the arms 24 may be slightly rounded. However, in instances where increased resistance to retrograde rotation is desired, the arms may be provided with edges designed to bite into the surfaces 44.

The resilient arms 24 of the stud in Figure 7 are bent into the disclosed helical shape prior to association with the work. The helical and symmetrical arrangement of the arms 24 is preferably such that the lead angle thereof is insufficient to result in complete encirclement of the stud shank 14, thus eliminating mutual overlapping thereof along the shank and permitting substantially axial projection of the stud through the work aperture. As these arms turn with the stud shank they must be further deflected in order for the extremities thereof to slide along the arcuate surfaces 44. It is this additional bending or flexing of the arms 24 which causes them to exert a strong clamping force. The arms 24, as illustrated in Figure 5, are deflected or bent into helical form during or as an incident to the rotation of the stud within the stamping. In each instance the stud arms are preferably deflected radially outwardly at their free extremities so as to secure the stud within its complementary outer work piece 20. It will be noted in Figure 5 that the arms 24 normally flare outwardly toward their free extremities so as to overlie the stock of the work piece 20 defining the margin of the aperture 22. Thus, when the stud is telescopically associated with the aperture 22 of the work piece 20, the arms 24 will flex inwardly sufficiently to permit passage of the stud but will automatically spring outwardly when the arms clear the work piece, thereby securing the stud against unintentioned detachment from the work sheet. It is common practice to employ a plurality of fasteners of this type with a complementary series of apertures in a work sheet or cowling part. It is important that these studs, at all times, be held within the work piece or cowling part in readiness for quick association with or detachment from the complementary aperture of the other fixed work part.

In Figures 1 to 7 inclusive, a stamping 26 in the form of a receptacle is disclosed, the central portion of which is spaced from the plane of the fixed or inner work sheet 18. The purpose of this spaced relation is to insure disengagement of the extremities of the resilient stud arms 24 from the stamping. Not infrequently, quickly detachable fasteners of the type described are supported as a group by the outer detachable work sheet 20. Therefore, it is essential that the free extremities of each resilient stud arm becomes completely detached from its companion stamping upon partial reverse rotation to the stud. After all of the studs have been loosened the outer plate 20 may be completely removed from association with the inner plate. In instances where a single fastener stud is employed this problem is not presented because reverse rotation applied to the stud causes it to be disengaged from the inner work piece and the outer work piece can be simultaneously moved as a unit with the stud.

In Figure 8 the stamping is slightly modified in that the central portion thereof is not spaced from the plane of the inner work piece 18, thus, as reverse rotation is imparted to the stud, the free extremities of the stud arms are soon brought into engagement with the inner surface of the work piece 20. Further rotation of the stud causes the work piece 20 to become separated from the work piece 18. In instances where two separable work pieces or sheets are secured together by a single stud, the structural arrangement disclosed in Figure 8 may be employed. However, when a plurality of fasteners are associated with a single detachable work sheet the form of stamping shown in Figures 1 to 7 is recommended.

In Figures 9 to 14 inclusive, a modified fastener device is shown. The stud member, as illustrated in these figures, is similar to the stud 12 previously described with the exception of a pair of protuberances 52 formed on the clamping side of the stud head. The stud, in Figures 9 to 14 inclusive, is designated generally by the numeral 12a and all of its constituent portions are given identifying numerals corresponding to the numerals employed in describing stud 12.

The stud 12a is first associated with the outer work piece 20 by inserting it through the aperture 22. The stud arms 24 normally flare outwardly to the position shown in Figure 13 so that after the stud has been completely inserted within the sheet 20 the free extremities of the arms overlie the work. In this manner the stud is secured against inadvertent detachment or loss from the work piece or cowling part 20. The inner work part 18 is provided with an aperture 30a corresponding to the aperture 30 of the stamping 26 previously described. Radial recesses 32a, like the previously described recesses 32, are designed to accommodate the resilient arms 24 and present the abutment edges 33a as previously described.

As the stud 12a is rotatably associated with the aperture 30a of the work piece 18 the free extremities of the resilient arms 24 engage the material of the sheet 18 adjacent the recesses 32a and are helically sprung so as to exert a resilient yet firm clamping action against the annular arcuate surfaces 44a. It will be noted that the plane of the surfaces 44a is spaced from the plane of the work piece 18. The arms are prevented from springing radially outwardly by the annular rib 36a extruded from the sheet 18. After the stud has been rotated slightly less than 180°, the protuberances 52 on the stud head 16 are brought into registration with companion apertures 54, Figures 10 and 14. The resilient or spring action of the arms 24 causes these protuberances to automatically interlock with apertures 54 and thus secure the stud against inadvertent rotation. In the disclosed embodiment the protuberances 52 are tapered so as to enable disengagement of said protuberances from their complementary apertures 54 when sufficient rotative force is applied to the stud. In other words, the tures 54 is sufficient to prevent unintentioned loosening of the stud but will permit retrograde rotation when detachment of the stud from the work piece 18 is required.

The material of the work piece 18 on one side of each of the recesses 32a is bent outwardly at 56, Figures 10 and 12, so as to facilitate disengagement of the free extremities of each of the arms 24 as they are rotated in the direction of loosening (clockwise as viewed in Figure 11). As these free extremities of the arms 24 approach the radial recesses 32a, the outwardly turned portions 56 serve to guide and direct these free extremities into the radial recesses and thus facilitate retrograde movement of the stud. That is to say, the outwardly turned portions 56 serve as deflectors to prevent the extremities of the stud arms from passing over the radial recesses.

From the foregoing, it will be apparent that the device shown in Figures 9 to 14 inclusive precludes the necessity of providing an auxiliary or separate stamping part such as the stamping 26 shown in Figures 1 to 7 inclusive. Also the extent to which the work piece 18 is preformed to accommodate the stud 12a does not involve the use of complicated or expensive dies. In certain instances it may only be necessary to provide a simple opening consisting of a central aperture and radial recesses. This will enable the rotative entrance of the stud and the subsequent deflection of the stud arms so as to firmly clamp the work sheets together. By having the locking arrangement in the stud head, the necessity of providing stops or abutments for directly engaging the stud arms is avoided. Hence the present invention contemplates a quickly operable fastener device which may be produced with the utmost of economy and which may be used without necessitating an expensive preforming operation upon either of the work pieces.

In Figure 15, a slightly modified fastening arrangement is disclosed. The structure of Figure 15 is similar in every respect to the device shown in Figures 9 to 14 except that the extruded locking portion is not spaced from the plane of the work sheet 18. The devices of Figure 15, like the device of Figure 8, is particularly adapted to be used in instances where work sheets are designed to be secured together by a single stud. As previously pointed out, in connection with the description of Figure 8, the locking portion which cooperates with the free extremities of the resilient arms need not be spaced from the plane of the inner or fixed work sheet when only a single stud is employed. Under such circumstances, the outer work sheet may be moved away from the fixed sheet or plate immediately upon registration of the extremities of the arms with the radial recesses 32a.

One of the important advantages resulting from the present invention resides in the adaptability of a stud of a given size to be used with work of various thicknesses. This is accomplished by employing the resilient stud arms which are deflected or stressed as an incident to the rotative association thereof with the work piece. If the thickness of the work piece is increased over that disclosed in the drawing, the stud arms will deflect to a greater extent. Conversely, if the thickness of the work piece is less the degree of deflection of the arms is proportionately less. This advantage constitutes a distinct advancement over cowl fasteners heretofore employed for a predetermined thickness of stock wherein a rigid lateral lug of a rotary stud member is designed to cooperate with a cam surface assointerlocking of the protuberances 52 and aperciated with the work. It will also be apparent that lateral shifting or deflection of the stud is resisted by stresses within the portion of the wire material which traverses the stud shank. The extent of such resisting stresses would, of course, be depedent upon a number of factors such as the rigidity of the wire stock and the configuration of that portion of wire which traverses the stud shank.

In the disclosed embodiment of the invention, the distance between the free extremities of the stud arms and abutment surface provided by the stud head is normally less than the overall thickness of the work for which the stud is designed to be used. That is to say, the free ends of the arms 24 are spaced from the abutment 16 a distance less than the given thickness of the work structure so that upon stud rotation into clamping position, the arms will be stressed to assume a clamping position at the given thickness of the structure in the vicinity of the aperture therethrough. As shown in the drawing, the lateral work engaging abutment provided by the underside of the stud head is located at one extremity of the stud shank. However, the invention contemplates positioning a lateral abutment at any point along a shank in cooperative relationship with the free extremities of the deflectable or laterally shiftable stud arms. In some applications it may be necessary to employ a shank of considerable length and in such instances the lateral abutment may be positioned intermediate the ends of the shank.

This application is a division of my pending application, Ser. No. 576,592, filed February 7, 1945, now issued as Patent No. 2,608,735, dated September 2, 1952.

For purposes of illustration, certain specific structural embodiments have been disclosed herein but obviously the invention is not limited to these embodiments but is capable of other modifications and changes without departing from the spirit and scope of the appended claims.

The invention is hereby claimed as follows:

1. The combination of an apertured work structure having oppositely disposed work surfaces of given thickness adapted to be clampingly engaged and with one of said surfaces presenting a camming abutment, and a quickly attachable and detachable fastener adapted to be inserted through the aperture in said work structure for clamping the oppositely disposed surfaces thereof and including a rotary stud member having a shank portion, a lateral abutment spaced from one end of said shank portion for clampingly engaging one of the work surfaces, an elongated latching arm of firm resilient material flexible in a direction extending laterally of said shank portion and having one extremity thereof secured to said shank portion and an opposite free extremity and said arm extending toward said lateral abutment longitudinally of said shank portion without intermediate encirclement thereof to adapt the stud for substantially axial projection through the work aperture, the said free extremity terminating externally of the periphery of said shank portion and short of said lateral abutment a distance less than the predetermined given thickness of the work structure in the vicinity of the aperture therethrough when in normal unclamped position and operable upon stud rotation to engage said camming abutment and to be yieldingly stressed thereby to assume a position in engagement with the adjacent work surface at the given thickness of said work surfaces from said lateral abutment whereby to yieldingly coact with the said abutment in clamping the work surfaces therebetween, and said latching arm when in work clamping position having a curvature defined in its resiliency in reaction to forces at the opposite ends thereof.

2. The combination of an apertured work structure having oppositely disposed work surfaces of given thickness adapted to be clampingly engaged and having spaced radial slots communicating with the aperture therethrough and said slots presenting substantially radially disposed abutment surfaces, and a quickly attachable and detachable fastener adapted to be inserted through the aperture in said work structure for clamping the oppositely disposed work surfaces thereof and including a rotary stud member having a shank portion, a lateral abutment spaced from one end of said shank portion for engaging one of the work surfaces, a pair of elongated latching arms of firm resilient material flexible in a direction extending laterally of said shank portion and each having one extremity thereof secured to said shank portion and an opposite free extremity and said arms extending toward said lateral abutment longitudinally of said shank portion without intermediate encirclement thereof to adapt the stud for substantially axial projection through the work aperture, the said free extremities of said latching arms terminating externally of the periphery of said shank portion and short of said lateral abutment a distance less than the predetermined given thickness of the work structure in the vicinity of the aperture therethrough when in normal unclamped position, and operable upon stud rotation to engage said radially disposed abutment surfaces and be yieldingly stressed thereby to assume a position in engagement with the adjacent opposed work surface at the given thickness of said work surfaces from said lateral abutment whereby to yieldingly coact with the lateral abutment in clamping the work surfaces therebetween.

3. The combination of an apertured work structure having oppositely disposed work surfaces adapted to be clampingly engaged and one of said surfaces presenting a cam incline along the margin of said aperture, and a quickly attachable and detachable fastener adapted to be inserted through the aperture in said work structure for clamping the oppositely disposed surfaces thereof and including a rotary stud member having a shank portion, a lateral abutment spaced from one end of said shank portion for engaging one of said work surfaces, an elongated work latching arm of firm resilient material having one extremity mounted on the shank portion with the opposite extremity thereof being free and extending toward said lateral abutment, said free extremity terminating externally of the periphery of the shank portion and when in normal unclamped position spaced from said lateral abutment a distance less than the thickness of the work structure in the vicinity of the aperture therethrough and engageable with said cam incline when the stud is subjected to rotation whereby the said free extremity of the arm will be stressed to yieldably coact with said lateral abutment to clamp the work surfaces therebetween, and said arm when in work clamping position having a curvature defined by its resiliency in reaction to forces at its opposite ends.

4. The combination as claimed in claim 3, wherein the work structure is provided with said spaced slots communicating with the aperture therethrough and wherein cam inclines are provided at opposite edges of each slot extending along the margin of said aperture, and wherein the pair of work latching arms is insertable through said slots with the free extremities thereof engageable with said cam inclines when the stud is subjected to rotation whereby the free extremities of the arms will be stressed to yieldingly coact with said lateral abutment to clamp the work surfaces therebetween.

5. The combination of an apertured work structure having an engagement surface adjacent the aperture therethrough and presenting opposed work surfaces adapted to be clampingly engaged, and a quickly attachable and detachable fastener including a rotary stud member having a shank portion, a lateral work engaging abutment spaced from one end of said shank portion, an elongated work latching arm flexible in a direction extending laterally of said shank portion and having one extremity mounted on said shank portion with the opposite extremity thereof being free and extending toward said abutment, the said free extremity of said arm terminating a distance from said lateral abutment less than the thickness of the work structure when in unclamped position and adapted upon stud rotation to engage said engagement surface for positioning the arm in clamping engagement therewith with the work structure interposed between said free extremity and said abutment.

6. The combination as claimed in claim 5, wherein said lateral work engaging abutment and the adjacent surface of the work structure engaged thereby are provided with mutually interengaging means for resisting unauthorized loosening of the stud member from clamped position.

7. The combination as claimed in claim 5, wherein there is provided an interengaging releasable connection between the shank portion of said stud member and the work structure for resisting retrograde rotation of the stud member.

8. The combination as claimed in claim 5, wherein there is associated with the work structure stop means adapted to limit rotation of the stud member in tightening direction.

9. The combination as claimed in claim 5, wherein the work structure has associated therewith means for limiting radially outward flaring of the latching arm when in clamped position.

10. The combination for use with an apertured work structure presenting opposed work surfaces adapted to be clampingly engaged, of a receptacle adapted to be carried by one work surface and having an aperture in line with the aperture in said work structure, means providing an engagement surface on the receptacle extending along the aperture in said receptacle, and a quickly attachable and detachable fastener including a rotary stud member having a shank portion arranged for insertion through the work structure and receptacle apertures, a lateral work engaging abutment spaced from one end of said shank portion and arranged to engage the other work surface, an elongated work latching arm flexible in a direction extending laterally of said shank portion and having one extremity mounted on said shank portion with the opposite extremity thereof being free and extending toward said abutment, the said free extremity of said arm terminating a distance from said lateral abutment less than the thickness of the work structure and receptacle when in unclamped position and adapted upon stud rotation to engage said receptacle engagement surface for positioning of the arm in clamping engagement therewith for clamping the work structure.

11. The combination as claimed in claim 10, wherein the engagement surface on said receptacle is provided with a cam rise operable to stress the latching arm as the stud member is rotated in tightening direction.

12. The combination as claimed in claim 10, wherein the receptacle is provided with a wall portion forming a stop flange engageable with said latching arm to limit rotation of the stud member in tightening direction.

13. The combination as claimed in claim 10, wherein the receptacle is provided with a wall portion serving to limit radially outward flaring of the latching arm when in clamped position.

14. The combination as claimed in claim 10, wherein said receptacle is provided with a detent engageable with the latching arm to resist inadvertent retrograde rotation of the stud member.

15. A fastener assembly comprising, in combination, a quickly attachable and detachable fastener stud adapted to be inserted through an apertured work structure of a given thickness for clamping the opposed work surfaces thereof, and an apertured fastener bracket adapted to be secured to the work structure with the aperture thereof in alignment with the work structure aperture, said fastener stud comprising a rotary stud member having a shank portion, a lateral work engaging abutment spaced from one end of said shank portion for clampingly engaging one of the work surfaces, a pair of elongated latching arms of firm resilient material for clampingly engaging said fastener bracket, said arms being oppositely and symmetrically disposed in respect to the shank and each having one extremity thereof secured to said shank portion with the opposite extremity thereof being free and extending toward said abutment, the said free extremities terminating externally of the periphery of the shank portion a distance from said abutment less than the predetermined given thickness of the work structure and said fastener bracket in the vicinity of the apertures therethrough when in normal unclamped position, said fastener bracket being provided with a cam surface against which the free extremities of the arms are engaged to effect the stressing of the arms, whereupon upon stud rotation the said free extremities of the latching arms upon engagement with the fastener bracket cam surface are stressed to yieldingly coact with said lateral abutment in clamping the work surfaces therebetween, and said latching arms when in clamping position having a curvature defined by their shape and resiliency in reaction to forces at the opposite ends thereof.

16. A fastener assembly comprising, in combination, a quickly attachable and detachable fastener stud adapted to be inserted through an apertured work structure of a given thickness for clamping the opposed work surfaces thereof, and an apertured fastener bracket adapted to be secured to the work structure with the aperture thereof in alignment with the work structure aperture, said fastener stud comprising a rotary stud member having a shank portion, a lateral work engaging abutment spaced from one end of said shank portion for clampingly engaging one of the work surfaces, a pair of elongated latching arms of firm resilient material for clampingly engaging said fastener bracket, said arms being oppositely and symmetrically disposed in respect to the shank and each having one extremity thereof secured to said shank portion with the opposite extremity thereof being free and extending toward said abutment, the said free extremities terminating externally of the periphery of the shank portion a distance from said abutment less than the predetermined given thickness of the work structure and said fastener bracket in the vicinity of the apertures therethrough when in normal unclamped position, said fastener bracket being provided with an abutment surface against which the free extremities of the arms are engageable in a radial direction to limit the radial movement thereof, whereupon upon stud rotation the said free extremities of the latching arms upon engagement with the fastener bracket are stressed while being limited in their radial movement to yieldingly coact with said lateral abutment in clamping the work surfaces therebetween, and said latching arms when in clamping position having a curvature defined by their shape and resiliency in reaction to forces at the opposite ends thereof.

OUGLJESA JULES POUPITCH.

REFERENCES CITED

The following references are of record in the file of this patent:

UNITED STATES PATENTS

| Number | Name | Date |
|---|---|---|
| 845,589 | Smith | Feb. 26, 1907 |
| 1,462,761 | Kugler | July 24, 1923 |
| 2,077,604 | Wiley | Apr. 20, 1937 |
| 2,159,363 | Chaffee | May 23, 1939 |
| 2,175,814 | Pender | Oct. 10, 1939 |
| 2,208,878 | Wiley | July 23, 1940 |
| 2,373,722 | Von Opel | Apr. 17, 1945 |